United States Patent [19]

Quigley et al.

[11] Patent Number: 5,520,385
[45] Date of Patent: May 28, 1996

[54] ARTICLE ASSEMBLED WITH THERMOREPONSIVE MATERIAL AND METHOD

[75] Inventors: Peter A. Quigley, Pocasset; Steven C. Nolet, Leominster, both of Mass.

[73] Assignee: Composite Development Corporation, West Wareham, Mass.

[21] Appl. No.: 99,601

[22] Filed: Jul. 30, 1993

[51] Int. Cl.⁶ .................................................. A63B 59/12
[52] U.S. Cl. ........................... 273/57.2; 273/129 K; 273/129 L; 428/29; 428/913; 428/36.9; 403/27
[58] Field of Search ..................... 428/29, 913, 36.9, 428/36.91, 36.92; 156/185, 241, 64; 273/73 D, 80 R, 81 R, 129 K, 57.2, 80.2, 80.3, 165, 129 L; 228/56.5, 103; 403/27–30

[56] References Cited

U.S. PATENT DOCUMENTS

| | | | |
|---|---|---|---|
| 1,560,346 | 11/1925 | Fuller | 156/64 |
| 2,537,124 | 1/1951 | Earle et al. | 156/64 |
| 3,197,350 | 7/1965 | Wedger et al. | 156/64 |
| 4,028,118 | 6/1977 | Nakasuji et al. | 106/21 |
| 4,052,059 | 10/1977 | Rigsby | 273/67 |
| 4,086,115 | 4/1978 | Sweet, Jr. et al. | 156/178 |
| 4,180,413 | 12/1979 | Diederich | 156/185 |
| 4,725,462 | 2/1988 | Kimura et al. | 428/29 |
| 4,826,550 | 5/1989 | Shimizu et al. | 156/166 |
| 4,919,983 | 4/1990 | Fremin | 428/35.7 |

*Primary Examiner*—James J. Seidleck
*Assistant Examiner*—Michael A. Williamson
*Attorney, Agent, or Firm*—Lahive & Cockfield

[57] ABSTRACT

An article for assembly with the application of heat to a selected temperature range to activate a thermoresponsive constituent, wherein the article avoids deterioration due to heating above the selected temperature range by including a thermochromatic material visibly disposed on the article. The thermochromatic material provides a visual indication in response to the thermoresponsive constituent being heated to the selected temperature range.

4 Claims, 4 Drawing Sheets

ARTICLE ASSEMBLED WITH THERMOREPONSIVE MATERIAL AND METHOD

BACKGROUND

This invention relates to articles assembled with thermoresponsive materials and to a method of assembling such articles. More particularly, the invention relates to safeguarding articles that are assembled with thermoresponsive materials and that can suffer structural degradation upon excessive heating.

One thermoresponsive material is an adhesive that becomes adherent, and useful as an adhesive, upon being heated. By way of example, commercially available thermoresponsive materials include hot-melt adhesives that are hard at normal ambient temperatures and that soften and become adherent when heated to a selected elevated temperature. Thermoresponsive adhesives are used in the assembly numerous articles of varied constructions.

By way of illustration, a thermoresponsive adhesive is used to secure a hockey stick blade to a hockey shaft. In one common hockey stick construction, the blade has a stem that projects into and telescopically seats within a receptacle at the base of the shaft. A thermoresponsive adhesive, located within the shaft receptacle at the interface with the blade stem, is heated to anchor the blade to the shaft. By way of further illustration, a hot-melt adhesive can be used to secure interfitting sail mast sections. In one such practice, a sail mast is assembled by telescopically interfitting two mast sections together with a hot-melt adhesive at the interface. Optionally, the assemblage includes an interfitting ferrule, typically partially coated with a hot-melt adhesive for affixing to one sail mast section and adapted for removably securing to the other sail mast section.

In typical applications, the thermoresponsive adhesive is applied at the interface of the elements to be joined. The assembler heats the adhesive with, for example, a blow torch or other heater. When the assembler deems the adhesive to be sufficiently hot, the elements are coupled together and the heating is stopped. After the assemblage cools, it is ready for use.

One drawback to such prior practices is that the assembler can easily overheat the elements being joined or otherwise assembled. Such overheating can cause the elements to degrade structurally. For example, metal and plastic elements can melt or become brittle. Similarly, plastic and wood elements can burn.

The term "assemble" is used herein in a broad sense, to include without limitations the related operations of join, attach, fit, and install. The invention may also have application to the processing or treatment of articles, without assembly.

Accordingly, an object of this invention is to provide a system for assembling articles with a thermoresponsive constituent and without overheating the articles.

Another object of the invention is to provide articles that are assembled with a thermoresponsive constituent, with minimal risk of overheating the articles.

A further object of the invention is to provide articles to be assembled with a thermoresponsive constituent and with which an assembler can easily perceive when the thermoresponsive constituent has been heated sufficiently.

An additional object of the invention is to provide an article for assembly with another article with a thermoresponsive adhesive, and for safeguarding the articles being assembled from structural degradation due to excessive heating.

Other general and specific objects of the invention will in part be obvious and will in part appear herein after.

SUMMARY OF THE INVENTION

The invention provides articles assembled with thermoresponsive constituent materials and a method of assembling such articles. More particularly, the invention provides a structure for safeguarding articles, that are assembled with thermoresponsive materials, from structural degradation due to overheating.

According to one embodiment where a thermoresponsive material is disposed over a first surface of a first element, a thermochromic material is provided in proximity to the first surface. Upon heating to elicit pre-defined properties from the thermoresponsive material, the thermochromic material is heated concurrently. The heated thermochromic material provides a visual indication when it is sufficiently heated, and correspondingly when the thermoresponsive material is sufficiently heated. This visual indication alerts the assembler to stop further heating. In this way, the invention avoids overheating of the first element.

In a further embodiment, the invention provides a thermochromic material proximate to the interface between two elements that are to be assembled with a thermoresponsive material, typically with a hot-melt adhesive that becomes adherent when heated to a specified temperature. The thermochromic material typically is coated on an external surface of a first of the two elements being assembled. Upon heating of the first element to heat the adhesive to its working temperature, the thermochromic material is heated concurrently. The thermochromic material is selected to exhibit a visually apparent or perceptible change when heated to a temperature that is selected to be related to the temperature at which the hot-melt adhesive becomes adherent, i.e., the working temperature of the adhesive. The thermochromic material thus provides a visual indication to the assembler when the adhesive has been heated sufficiently for secure adhesive bonding to the two elements, so that the assembler can terminate heating and thereby avoid overheating either of the two elements.

In one specific illustrative practice of the invention, the first element is a hockey stick shaft and the second element is a hockey stick blade. In another specific practice, the two elements are different sections of a sail mast that are telescopically interfit, typically with a ferrule or spline therein.

In one practice of the invention, the visibly perceptible change in a thermochromic material is a change in color. In another practice, the thermochromic material changes opacity, typically being more opaque when cool than when heated to the selected temperature that is related to the adhesive working temperature. A further practice is to provide a visually perceptible pattern or legend on one article that is to be assembled and to cover that indicia with a thermochromic coating that is opaque when cool, i.e. at environmental temperatures. When the thermochromic coating is heated to the selected temperature, it becomes visually transparent and displays the underlying indicia to the assembler, thereby informing the assembler to stop the heating process. The term indicia is used herein to include various visibly perceptible features, including color, pattern, design, and one or more words.

The invention thus provides a thermoresponsive indicator element on an article that is assembled, treated or processed, with heat that activates a thermoresponsive constituent present on the article or applied to it. The thermoresponsive indicator has an optical property that changes when the indicator is heated from a normal temperature, below the elevated range where the thermoresponsive constituent is active, to and above that elevated range. This change in the optical property signals the assembler to discontinue heating the article. It thereby protects the article from damage and other deterioration from heating above the selected temperature range that activate the constituent.

The optical property of the thermoresponsive indicator is such that the change when heated is visually apparent, i.e., perceptible. The optical property typically includes color or opacity.

The thermoresponsive indicator that the invention provides typically includes a coating or layer of a thermochromic material. Such a material can be selected to have a selected transition temperature, i.e., the temperature at which its color or opacity changes, and the selection can be made to correspond to the activating temperature of the thermoresponsive constituent, e.g., a hot-melt adhesive, with which it is used.

An optional feature of the thermoresponsive indicator is an indicia element, on the article to be protected from overheating, and at least partially covered by the thermochromic material. The indicia element and the thermochromic element are selected to change the visual appearance or visibility of the indicia when heated from ambient to the activating temperature.

The invention accordingly comprises of several steps and the relation of one or more of such steps with respect to each of the others, and comprises the articles and apparatus embodying features of construction, combinations of elements, and arrangements of parts adapted to effect such steps, all as exemplified in the following detailed disclosure, and the scope of the invention is indicated in the claims.

BRIEF DESCRIPTION OF THE DRAWINGS

For a fuller understanding of the nature and objects of the invention, reference is to be made to the following detailed description and the accompanying drawings in which.

DESCRIPTION OF ILLUSTRATED EMBODIMENTS

The present invention relates to articles assembled with thermoresponsive materials and to a method of assembling such articles. More particularly, the invention relates to safeguarding articles that are assembled with thermoresponsive materials and that can suffer structural degradation by excessive heating.

As previously discussed, many different types of articles such as hockey sticks, sail masts and insulator window coverings can be assembled using thermoresponsive materials. For example, a thermoresponsive adhesive can be used to affix, a hockey stick blade to a hockey stick shaft. Similarly, an upper portion of a sail mast can be secured to a lower portion of a sail mast using a ferrule coupling in combination with a thermoresponsive adhesive. Additionally, a transparent or translucent insulator window covering can be made from thermoresponsive materials which shrink to fit a window frame in response to being heated to a particular temperature. One difficulty in assembling all of the above-mentioned articles is that excessive heat can cause structural degradation to the materials being assembled. For example, in the case of a hockey stick, the shaft can become brittle or even melt if it is overheated. A sail mast can suffer similar problems. In the case of a window covering, applying too much heat can distort or destroy the covering. Such problems can become very costly. The present invention avoids such problems.

Figure 1:
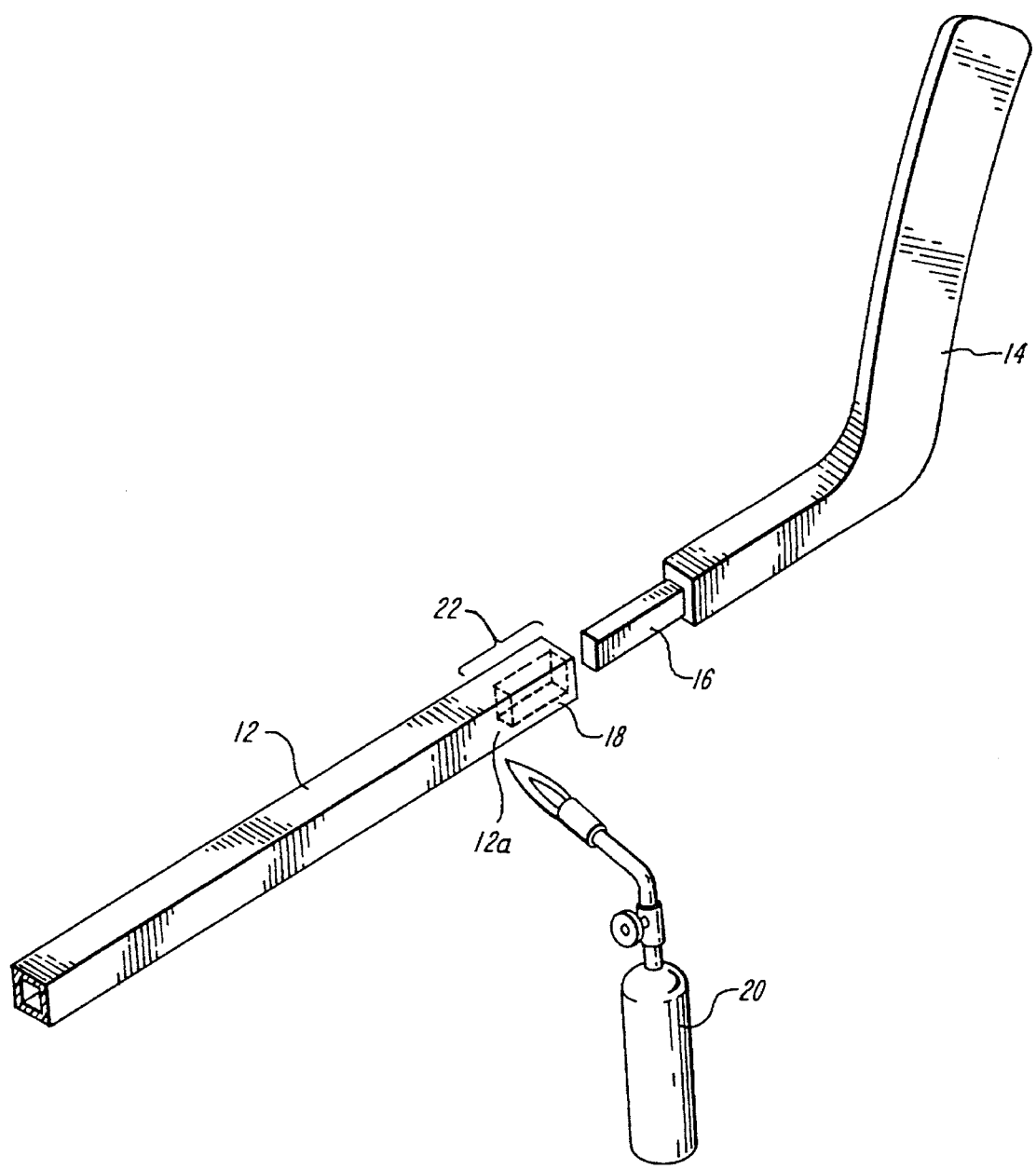
FIG. 1 shows the assembly of a hockey stick blade and shaft according to the invention.

FIG. 1 shows a hockey stick 10. The stick 10 includes a shaft 12 coupled to a blade 14. The blade 14 has a stem 16 that can project into and telescopically seat within the receptical 18 at the base of the shaft 12. A thermoresponsive adhesive can be applied to the interface between the receptical 18 and the stem 16. Subsequent to the stem 16 being seated in the receptical 18, the torch 20 heats the adhesive to a temperature at which the adhesive becomes adherent, thus bonding the shaft 12 to the blade 14.

The shaft 12 can suffer structural degradation if overheated. Thus, according to on embodiment of the invention, the outer surface 12a of the base 22 is coated with a thermochromatic material 16. The thermochromatic material 16 provides a visual indication in response to the surface 12a being heated to a temperature indicative of the thermoresponsive adhesive being sufficiently heated. The thermoresponsive adhesive is selected so that the temperature at which it becomes adherent and proper bonding occurs between the shaft 12 and the blade 14 is significantly lower than that temperature at which structural degradation occurs.

Figure 2:
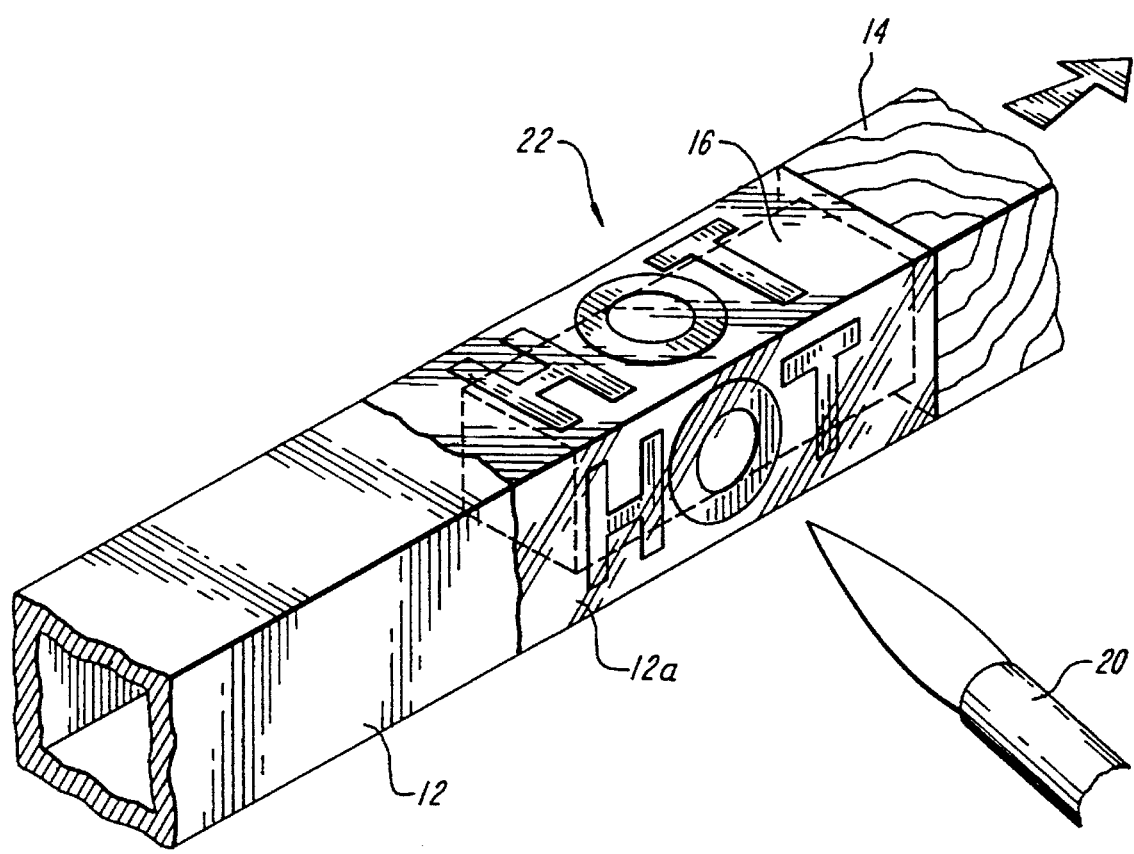
FIG. 2 shows an enlarged view of the interface between the blade and the shaft of FIG. 2.

FIG. 2 shows an enlarged view of the base 22. According to one preferred embodiment, the stem 16 is coated with a thermoresponsive adhesive such as, part number 3764, available from Minnesota Mining and Manufacturing Company. According to another embodiment, the receptical 18 can be coated with the thermoresponsive adhesive. During assembly, the stem 16 inserts into the receptical 18. The torch 20 then heats the base 22, thus activating the thermoresponsive adhesive. As discussed above, at lease one outer surface 12a of the base 22 includes a coating of a thermochromatic pigmenting, such as those supplied by Matsui International Company, Inc., 1310 East Grand Avenue, El Segundo, Calif. 90245. In operation, when surface 12a approaches a temperature which indicates that the thermoresponsive adhesive has reached the temperature at which it becomes adherent, the thermochromatic material on surface 12a activates and provides a visual indication to the torch operator. In one embodiment, the thermochromatic material changes color to provide the required visual indication. In other embodiments, the thermochromatic material changes opacity, typically being more opaque when cool then when hot. A further practice is to provide a visually perceptive pattern or legend on the article being assembled and to cover that indicia with a thermochromatic coating that is opaque when cool. When the thermochromatic coating is heated to the selected temperature, it becomes transparent and reveals the underlying indicia. As can be seen, in the specific example of FIG. 2, the word "HOT" appears to indicate to the torch operator that the base 22 has been heated to the appropriate temperature.

In alternative embodiments, the shaft 12 can include a stem and the blade can have a receptical. Also, the receptical 18, along with the stem 16 can be cylindrical in nature.

Figure 3:
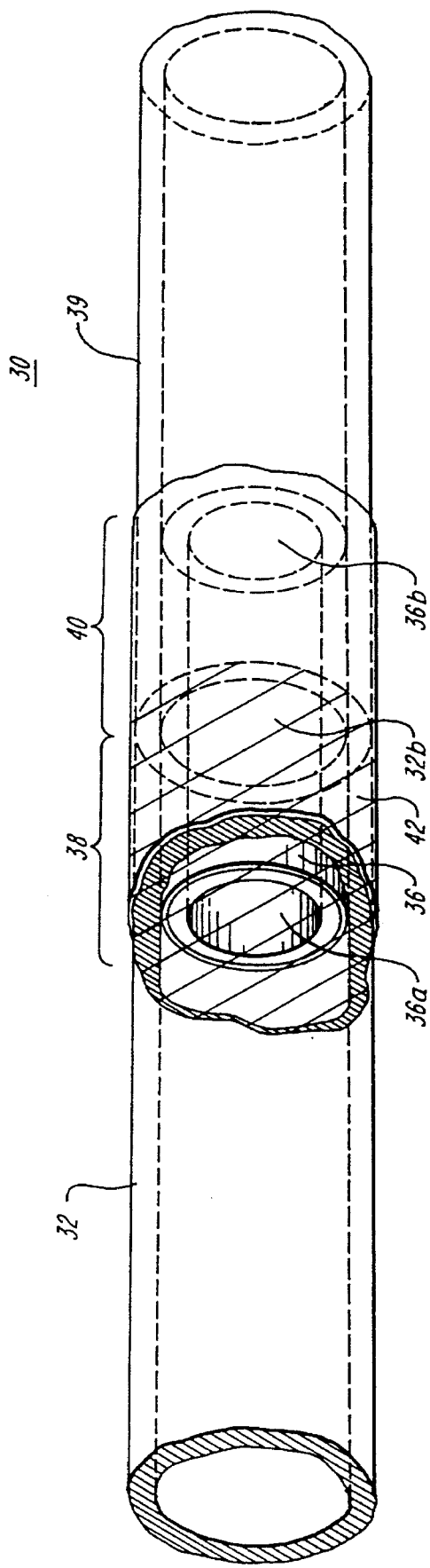
FIG. 3 shows the assembly of two shafts, with ferrule, in accord with the invention.

FIG. 3 depicts an alternative embodiment 30 of the invention. The structure 30 includes two shafts 32 and 34 coupled together by a ferrule 36. According to the depicted embodiment 30, the shaft 32 has a receptical 38. Similarly, the shaft 34 has a receptical 40. The ferrule 36 is adapted to insert into recepticals 38 and 40, thereby coupling shaft 32 to shaft 34. The receptical 38 is adapted to receive end 36a of ferrule 36. Likewise, the receptical 40 is adapted to receive end 36b of the ferrule 36. According to a preferred embodiment, the shaft 34 remains removable from ferrule 36. In contrast, a thermoresponsive adhesive bonds shaft 32 to ferrule 36. According to one embodiment, the inner surface of receptical 32a is coated with the thermoresponsive adhesive. Alternatively, the outer surface of end 36a of the ferrule 36 can be coated with the thermoresponsive adhesive. As in the case of surface 12a of FIG. 2, the outer surface 32b of receptical 32a is coated with a thermochromatic material. An assembler can heat the receptical 38 following insertion of the ferrule 36. The thermochromatic material provides a visual indication when the outer surface 32b reaches a temperature indicative of the adhesive being at a sufficient temperature for proper bonding. As described with regard to FIGS. 1 and 2, and as shown by hash lines 42, the visual indication can be any of a number of indicia, including changes in color and in opacity.

The above described system is very useful in the construction of sail masts. Typical composite materials used in the construction of sail masts can suffer polymer matrix breakdown when overheated. Similarly, aluminum masts can anneal if overheated. Since the present invention provides an assembler with a visual indication of shaft temperature during assembly, structural failures due to overheating can be avoided.

Figure 4:
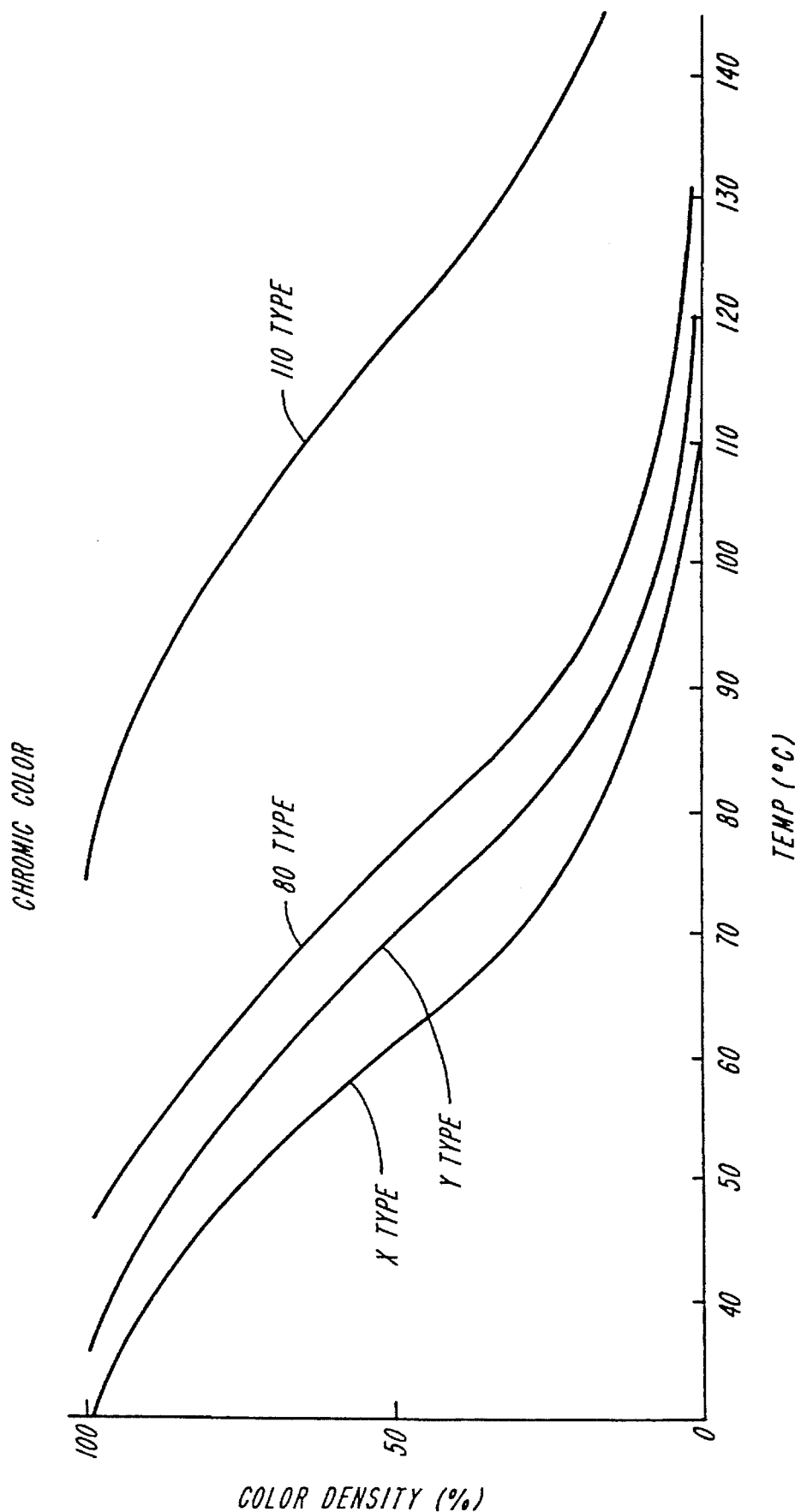
FIG. 4 is a graph of thermochromic properties as a function of temperature for four thermocromic materials.

FIG. 4 shows a graph which is illustrative of the thermochromatic properties of four pigments, Type X, Type Y, Type 80, and Type 110, all available from Matsui International Company, 1310 E. Grand Avenue, El Segundo, Calif. 90245. The graph indicates that each of the materials transit from generally black at 0° C. to fully red at varying temperatures. By way of example, Type 80 begins to transit to red at approximately 80° C. and is fully red at 140° C. The Type X and Type Y thermochromatics can be used in conjunction with materials that suffer structural degradation at lower temperatures. Alternatively, Type 110 can be used in conjunction with materials that suffer structural degradation at much higher temperatures. In this way, the present invention provides a system for assembling various types of articles with a thermoresponsive materials, without risking structurally degrading the articles being assembled due to excessive heating.

It will thus be seen that the objects set forth above, along with those made apparent from the preceding description, are efficiently attained. It will be understood that changes may be made in the above constructions and in the foregoing sequences of operation without departing from the scope of the invention. It is accordingly intended that all matter contained in the above description or shown in the accompanying drawings be interpreted as illustrative rather than in a limiting sense. It is also to be understood that the following claims are intended to cover all of the generic and specific features of the invention as described herein, and all statements of the scope of the invention which, as a matter of language, might be said to fall there between.

We claim:

1. A hockey stick for assembly with the application of heat to a selected temperature range to activate a thermoresponsive adhesive, said hockey stick being characterized by deterioration when subjected to heat in excess of said temperature range, said hockey stick comprising a thermoresponsive adhesive disposed on a surface of an element thereof, a shaft element having first and second axial ends, a blade element for engagement with said first axial end of said shaft element and for assembly thereto with the thermoresponsive adhesive, warning indicia disposed on an outer surface of said blade or shaft, and a thermoresponsive coating disposed on said warning indicia, said coating having a relatively high opacity when below a first temperature in said selected range, thereby hiding said warning indicia from view and having a relatively low opacity when at a second temperature above said first temperature and below the temperature of said deterioration, thereby exposing said warning indicia to view.

2. A hockey stick according to claim 1 wherein said shaft element includes said socket receptacle located at said first axial end, and wherein said first axial end includes an outer surface and said warning indicia is disposed on said outer surface.

3. A hockey stick according to claim 1 wherein said blade element includes said socket receptacle located at a stick end, and wherein said stick end includes an outer surface and said warning indicia is disposed on said outer surface.

4. A hockey stick according to claim 1 wherein said thermoresponsive adhesive is ready for adhesive assembly when heated to said selected temperature range.

\* \* \* \* \*